(12) United States Patent
Lee et al.

(10) Patent No.: US 12,155,057 B2
(45) Date of Patent: Nov. 26, 2024

(54) ANODE FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Jinhyon Lee, Yongin-si (KR); Hongjeong Kim, Yongin-si (KR); Hyeri Eom, Yongin-si (KR); Sangjun Lee, Yongin-si (KR); Daeseop Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 617 days.

(21) Appl. No.: 17/594,486

(22) PCT Filed: Apr. 17, 2020

(86) PCT No.: PCT/KR2020/005152
§ 371 (c)(1),
(2) Date: Oct. 18, 2021

(87) PCT Pub. No.: WO2020/218780
PCT Pub. Date: Oct. 29, 2020

(65) Prior Publication Data
US 2022/0263063 A1 Aug. 18, 2022

(30) Foreign Application Priority Data

Apr. 24, 2019 (KR) .................. 10-2019-0047928

(51) Int. Cl.
*H01M 4/133* (2010.01)
*H01M 4/36* (2006.01)
(Continued)

(52) U.S. Cl.
CPC ........... *H01M 4/133* (2013.01); *H01M 4/364* (2013.01); *H01M 4/366* (2013.01); *H01M 4/587* (2013.01);
(Continued)

(58) Field of Classification Search
CPC ...... H01M 4/133; H01M 4/366; H01M 4/583; H01M 4/587; H01M 2004/021
See application file for complete search history.

(56) References Cited

U.S. PATENT DOCUMENTS

| | | |
|---|---|---|
| 2014/0065478 A1 | 3/2014 | Mitsuhashi et al. |
| 2014/0072848 A1 | 3/2014 | Hagiwara |

(Continued)

FOREIGN PATENT DOCUMENTS

| | | |
|---|---|---|
| CN | 104126242 A | 10/2014 |
| CN | 108023064 A | 5/2018 |

(Continued)

OTHER PUBLICATIONS

International Search Report for corresponding Application No. PCT/KR2020/005152 dated Jul. 22, 2020, 4pp.

(Continued)

*Primary Examiner* — Christopher P Domone
(74) *Attorney, Agent, or Firm* — Lewis Roca Rothgerber Christie LLP

(57) ABSTRACT

The present invention relates an anode for a lithium secondary battery and a lithium secondary battery comprising same. The anode for a lithium secondary battery comprises a current collector; and an anode active material layer formed on the current collector and including a carbon-based anode active material, wherein the anode active material layer has a multi-layer structure of three or more layers and at least one layer of the anode active material layer is an oriented layer having a degree of divergence (DD) of 19 or greater, the DD being defined by the following formula 1:

Degree of Divergence (DD)=$(I_a/I_{total})*100$ [formula 1]

(In formula 1,
$I_a$ is a sum of peak intensities at non-planar angles measured by XRD using a CuKα ray, and,
$I_{total}$ is a sum of peak intensities at all angles measured by XRD using a CuKα ray).

14 Claims, 4 Drawing Sheets

(51) Int. Cl.
- *H01M 4/587* (2010.01)
- *H01M 10/0525* (2010.01)
- *H01M 4/02* (2006.01)

(52) U.S. Cl.
CPC .............. *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2014/0170487 A1 | 6/2014 | Takahata et al. |
| 2014/0287316 A1 | 9/2014 | Ahn et al. |
| 2018/0123120 A1* | 5/2018 | Lee ................. H01M 4/587 |
| 2018/0123131 A1 | 5/2018 | Lee et al. |
| 2018/0159118 A1 | 6/2018 | Lee et al. |
| 2018/0287145 A1 | 10/2018 | Lee et al. |
| 2018/0315985 A1* | 11/2018 | Torita ............. H01M 10/0525 |
| 2019/0305308 A1 | 10/2019 | Lee et al. |
| 2020/0388832 A1 | 12/2020 | Kwon et al. |
| 2021/0280869 A1* | 9/2021 | Nakano ............. H01M 4/583 |

FOREIGN PATENT DOCUMENTS

| | | |
|---|---|---|
| CN | 108140810 A | 6/2018 |
| CN | 108701816 A | 10/2018 |
| CN | 108807843 A | 11/2018 |
| JP | 2013-069579 A | 4/2013 |
| JP | 2013-089574 A | 5/2013 |
| JP | 2013-131297 A | 7/2013 |
| JP | 2014-086258 A | 5/2014 |
| JP | 2014-137879 A | 7/2014 |
| JP | 5601550 B2 | 10/2014 |
| JP | 5652682 B2 | 1/2015 |
| JP | 5783433 B2 | 9/2015 |
| JP | 2017-50102 A | 3/2017 |
| KR | 10-2014-0095980 A | 8/2014 |
| KR | 10-2018-0004587 A | 1/2018 |
| KR | 10-2018-0035693 A | 4/2018 |
| KR | 10-2018-0047846 A | 5/2018 |
| KR | 10-2018-0048131 A | 5/2018 |
| KR | 10-2018-0062390 A | 6/2018 |
| KR | 10-2018-0065385 A | 6/2018 |
| KR | 10-2018-0121833 A | 11/2018 |

OTHER PUBLICATIONS

Korean Notice of Allowance dated Feb. 27, 2023, issued in corresponding Korean Patent Application No. 10-2019-0047928 (3 pages).

Chinese Office Action, with English translation, dated Dec. 19, 2023, issued in corresponding Chinese Patent Application No. 202080030569.6 (18 pages).

European Search Report for EP Patent Application No. 20796290.3 dated Mar. 15, 2024, 7 pages.

Huang, et al., "Sn—Co-artificial graphite composite as anode material for rechargeable lithium batteries", Electrochimica Acta 56 (2010), pp. 476-482.

* cited by examiner

US 12,155,057 B2

ANODE FOR LITHIUM SECONDARY BATTERY AND LITHIUM SECONDARY BATTERY COMPRISING SAME

CROSS-REFERENCE TO RELATED APPLICATIONS

This application is a National Phase Patent Application of International Patent Application Number PCT/KR2020/005152, filed on Apr. 17, 2020, which claims priority of Korean Patent Application No. 10-2019-0047928, filed Apr. 24, 2019. The entire contents of both of which are incorporated herein by reference.

TECHNICAL FIELD

It relates to anode for a lithium secondary battery and a lithium secondary battery including the same.

BACKGROUND ART

A lithium secondary battery has recently drawn attention as a power source for small portable electronic devices, and the lithium secondary battery uses an organic electrolyte solution and thereby, has twice or more as high a discharge voltage as a conventional battery using an alkali aqueous solution, and accordingly, has high energy density.

As for a cathode active material of a rechargeable lithium battery, oxides including lithium and a transition metal with a structure capable of intercalating/deintercalating lithium ions, such as $LiCoO_2$, $LiMn_2O_4$, $LiNi_{1-x}Co_xO_2$ (0<x<1), and the like have been mainly used.

As for anode active materials, various carbon-based materials capable of intercalating/deintercalating lithium ions such as artificial graphite, natural graphite, hard carbon, and the like have been used, and recently, a non-carbon-based anode active material such as silicon or tin has been researched in order to obtain high capacity.

TECHNICAL SOLUTION

One embodiment provides an anode for a lithium secondary battery exhibiting excellent physical properties, such as good adhesion and good electrolyte impregnation.

Another embodiment provides a lithium secondary battery including the anode.

One embodiment provides an anode for a lithium secondary battery including a current collector; and an anode active material layer including a carbon-based anode active material, wherein the anode active material layer has a multi-layer structure of three or more layers, and at least one layer of the anode active material layer is an oriented layer having a DD (Degree of Divergence) value defined by Equation 1 of 19 or more.

DD (Degree of Divergence)=$(I_a/I_{total})$*100     [Equation 1]

(In Equation 1, $I_a$ is a sum of peak intensities at non-planar angles measured by XRD using a CuKα ray, and $I_{total}$ is a sum of peak intensities at all angles measured by XRD using a CuKα ray.)

The active material layer may be a multi-layer structure of three layers or five layers.

The anode active material layer having the multi-layer structure of three layers or more may have an inner layer contacted with the current collector, a surface layer, and at least one middle layer between the inner layer and the surface layer, and the surface layer may be the oriented layer with the DD value of 19 or more.

The oriented layer may have a DD value of 19 to 60.

The $I_a$ may be a sum of peak intensities at 2θ=42.4±0.2°, 43.4±0.2°, 44.6±0.2°, and 77.5±0.2° measured by XRD using a CuKα ray, and the $I_{total}$ may be a sum of peak intensities at 2θ=26.5±0.2°, 42.4±0.2°, 43.4±0.2°, 44.6±0.2°, 54.7±0.2°, and 77.5±0.2° measured by XRD using a CuKα ray.

The peak intensities may be a peak integral area value.

At least one layer of the anode active material layer may be an oriented layer having the DD value of 19 or more, and at least one layer may be a non-oriented layer having the DD value of less 19.

The anode may have a peak intensity ratio, at a (002) plane relative to a (110) plane, that is, $I_{(002)}/I_{(110)}$ of 50 to 300 when measured by XRD using a CuKα ray.

The oriented layer may have a peak intensity ratio, at a (002) plane relative to a (110) plane, that is, $I_{(002)}/I_{(110)}$ of 10 to 200 when measured by XRD using a CuKα ray. The non-oriented layer may have a peak intensity ratio, at a (002) plane relative to a (110) plane, that is, $I_{(002)}/I_{(110)}$ of 200 to 500 when measured by XRD using a CuKα ray.

The anode active material layer may have a total thickness of 100 μm to 1000 μm.

The carbon-based anode active material may be artificial graphite or a mixture of artificial graphite and natural graphite.

Furthermore, the anode active material layer may further include a Si-based anode active material, a Sn-based anode active material, a lithium vanadium oxide, or a combination thereof.

Another embodiment provides a lithium secondary battery including the anode, a cathode including a cathode active material; and an electrolyte.

The lithium secondary battery may be for a high power.

Other embodiments are included in the following detailed description.

ADVANTAGEOUS EFFECTS

An anode for a lithium secondary according to one embodiment may provide a lithium secondary battery exhibiting excellent battery performances.

MODE FOR INVENTION

Hereinafter, embodiments of the present invention are described in detail. However, these embodiments are exemplary, the present invention is not limited thereto, and the present invention is defined by the scope of claims.

An anode according to one embodiment of the present invention includes a current collector and an anode active material layer formed on the current collector and including a carbon-based anode active material, the anode active material layer has a multi-layer structure of three or more layers, and at least one layer of the anode active material layer is an oriented layer having a DD (Degree of Divergence) value of 19 or more.

The DD value may be defined by Equation 1.

$$DD \text{ (Degree of Divergence)} = (I_a/I_{total})*100 \quad \text{[Equation 1]}$$

In Equation 1, $I_a$ is a sum of peak intensities at non-planar angles measured by XRD using a CuKα ray, and $I_{total}$ is a sum of peak intensities at all angles measured by XRD using a CuKα ray.

Herein, the non-planar angles denote $2\theta=42.4\pm0.2°$, $43.4\pm0.2°$, $44.6\pm0.2°$, and $77.5\pm0.2°$ when measured by XRD using a CuKα ray, that is, a (100) plane, a (101)R plane, a (101)H plane, and a (110) plane. In general, graphite has a structure classified into a rhombohedral structure and a hexagonal structure having an ABAB type of stacking sequence according to a stacking order of graphene layers, and the R plane denotes the rhombohedral structure, while the H plane denotes the hexagonal structure.

In addition, all the angles denote $2\theta=26.5\pm0.2°$, $42.4\pm0.2°$, $43.4\pm0.2°$, $44.6\pm0.2°$, $54.7\pm0.2°$, and $77.5\pm0.2°$ when measured by XRD using a CuKα ray, that is, a (002) plane, a (100) plane, a (101)R plane, a (101)H plane, a (004) plane, and a (110) plane. A peak at $2\theta=43.4\pm0.2°$ may be also considered to appear by overlapping a peak of a (101)R plane of a carbon-based material with another peak of a (111) plane of a current collector, for example, Cu.

In general, peak intensity indicates a height of a peak or an integral area of the peak, and according to an embodiment, the peak intensity indicates the integral area of a peak.

In an embodiment, the XRD is measured under a measurement condition of $2\theta=10°$ to $80°$, a scan speed (°/S) of 0.044 to 0.089, and a step size (°/step) of 0.013 to 0.039 by using a CuKα ray as a target ray but removing a monochromator to improve a peak intensity resolution.

Figure 1:
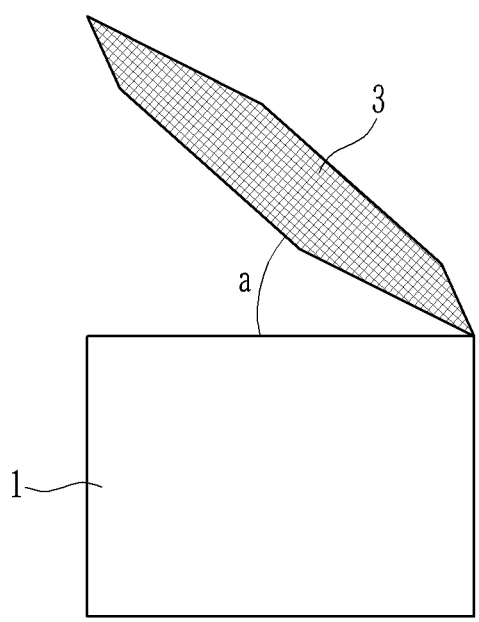
FIG. 1 is a schematic view showing orientations according to an embodiment of the present invention.

The DD value indicates that the anode active material included in the anode active material layer are oriented at a predetermined angle, and the larger value indicates that the anode active material is well oriented. That is, as schematically shown in FIG. 1, as the DD value is increase, an angel (a) is increased when the anode active material 3 is oriented to one side of the substrate 1 with the angle (a). Furthermore, the DD value is maintained after charges and discharges.

In one embodiment, the DD value may be 19 to 60, or may be 19 to 40. The DD value of the orientation layer satisfying the above range indicates that the anode active material is oriented with the predetermined angle which is maintained after charges and discharges.

When the DD value of the orientation layer is more than 19, the anode active material is not horizontally oriented to the current collector and is sufficiently oriented to readily transfer lithium ions, that is, it is arranged to the current collector with a predetermined angle, and for example, it indicates that a (002) plane of graphite is arranged with an angle of more than 0 degrees (°) and less than 90 degrees (°) which indicates to control the non-orientation, whereas the DD value of less than 19 may increase a direct current internal resistance, abruptly deteriorate rate capability, particularly, high-rate capability, and deteriorate the cycle-life characteristics. Furthermore, the DD value of 19 or more, and 60 or less does not indicate that the anode active material is substantially vertically orientated to the current collector, and if it is vertically oriented, shortcomings such as battery deformation may occur as the repeated charging and discharging progress.

The anode active material layer may have a multi-layer structure of three layers or more, and in one embodiment, it may have a multi-layer structure of three to five layers. In the multi-layer structure, at least one layer may be an oriented layer having the DD value of 19 or more.

Figure 2:
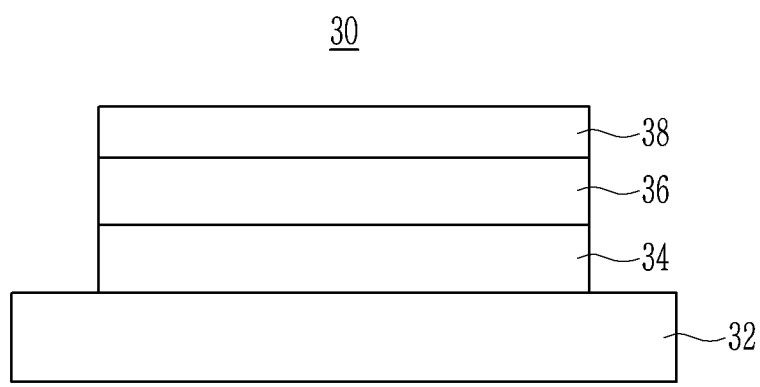
FIG. 2 is a schematic view showing a structure of the anode according to one embodiment of the present invention.

Herein, the anode active material layer having a multi-layer structure of three layers or more may include an inner layer contacted a current collector, a surface layer, and at least one middle layer between the inner layer and the surface layer, and it is desirable that the surface layer is an oriented layer having the DD value of 19 or more. When it is illustrated based on FIG. 2, the anode 30 has a structure in which a current collector 32, an inner layer 34, a middle layer 36, and a surface layer 38 are sequentially stacked, and herein, the surface layer 38 is an oriented layer having the DD value of 19 or more.

When the surface layer is an oriented layer, i.e., has a high orientation degree of the anode active material, the anode active material is not horizontally and parallelly oriented to the current collector and is positioned at a standing state at a predetermined angle to the current collector, and this allows to readily immerse the electrolyte to the anode active material layer, to readily transfer lithium ions, and to shorten a transferring path, and thus, the resulting anode may be suitably applied as a high-power battery, and may exhibit excellent high-rate capability characteristics.

If the surface layer is not an oriented layer, i.e., is a non-oriented layer which indicates non-dispersion in various ways in which the anode active material is horizontally and parallelly oriented, or is vertically positioned with respect the current collector, the impregnation of the electrolyte may be deteriorated and the transferring path of lithium ions may be increased and thus, it may not be suitably applied as a high-power battery.

In the anode active material layer, at least one layer may be an oriented layer having the DD value of 19 or more, and at least one layer may be non-oriented layer having the DD value of less than 19. As such, when the anode active material layer has the multi-layer structure of three or more layers and both an oriented layer and a non-oriented layer, the uniformity of the reaction may be ensured in the same layer, and migration of the binder may be inhibited during drying so that a cohesion force at a boundary portion between the oriented layer and the non-oriented layer may be increased to improve the adhesion, the electron resistance of the active mass layer (includes an active material, a binder, and optionally, a conductive material, and refers to an active material layer on the current collector) may also be reduced, and ionic resistance of the anode may be reduced. Even though the anode active material layer has a multi-layer structure, if the oriented portion and the non-oriented portion are presented together in the same layer, not presented in separated layers, during drying, the migration of the binder may occur in the oriented portion/non-oriented portion to cause a decrease in adhesion, the ionic resistance of the anode may be increased, and the impregnation of the electrolyte in the oriented portion is different from in the non-oriented portion, thereby increasing non-uniformity of the reaction, and resulting in local non-uniformity of the thickness at full charge and the precipitation of lithium during charge at a high rate.

Furthermore, even if the anode active material layer has a multi-layer structure and an oriented layer and a non-oriented layer, if the structure is a two-layer structure, that is, one oriented layer and one non-oriented layer, it is difficult to suppress migration of the binder during drying so that the ionic resistance and the electron resistance of the active mass layer in the electrode may be increased.

According to one embodiment, the anode active material layer may include three layers or more, or three layers to five layers, and if the number of the layers is an odd number, the oriented layer may correspond to a first, a third, and a fifth layer, and the non-oriented layer may correspond to a second and a fourth layer, when the surface is called the first layer.

Furthermore, when the anode active material layer includes four layers, a first and a fourth layer may be oriented layers, and a second and a third layer may be non-oriented layers.

The anode may have a peak intensity ratio, at a (002) plane relative to a (110) plane, that is, $I_{(002)}/I_{(110)}$ of 50 to 300 when measured by XRD using a CuKα ray. When $I_{(002)}/I_{(110)}$ of the anode satisfies the above range, a decrease in internal resistance, an improvement in high-rate capabilities and the cycle-life characteristics, and a decrease in the active mass layer in the electrode may be obtained.

Furthermore, the oriented layer may have a peak intensity ratio, at a (002) plane relative to a (110) plane, that is, $I_{(002)}/I_{(110)}$ of 10 to 200 when measured by XRD using a CuKα ray. When $I_{(002)}/I_{(110)}$ of the oriented layer satisfies the above range, a decrease in internal resistance, an improvement in high-rate capabilities and the cycle-life characteristics, and a decrease in the active mass layer in the electrode may be obtained.

The non-oriented layer may have a peak intensity ratio, at a (002) plane relative to a (110) plane, that is, $I_{(002)}/I_{(110)}$ of 200 to 500 when measured by XRD using a CuKα ray. When the $I_{(002)}/I_{(110)}$ of the non-oriented layer is included in the range, the contacts of the active material particles with each other may be increased to reduce resistance of the active mass in the electrode.

In an embodiment, since the DD value is a peak value at a non-plane relative to a peak value at all the angles and thus is not linked with $I_{(002)}/I_{(110)}$, the $I_{(002)}/I_{(110)}$ of 50 to 300 does not mean the DD values of the first layer and the second layer within the above range.

In addition, the total thickness of the anode active material layer may be 100 μm to 1000 μm. As such, the anode active material layer may be formed at a thickness of a maximum of 1000 μm which is extremely larger than the general maximum thickness of the anode active material layer of 70 μm. The anode active material layer is a multi-layer structure of three or more layers, which is desired if the total thickness of all active material layers falls within the range, but the thickness of each layer is not limited. In one embodiment, the anode active material layer is formed in a multi-layer structure of three or more layers, and herein, the DD value of the surface layer is controlled to be 19 or more to improve the impregnation of the electrolyte, so even if a thick layer is formed, the high-rate charge and discharge may be effectively performed, and thus, it may be suitably applied to a high-power battery.

In one embodiment, the DD value is obtained by charging and discharging a rechargeable lithium battery including the anode, disassembling the battery when fully discharged to obtain the anode, and measuring about the anode by XRD. Herein, the charge and discharge are once to twice performed at about 0.1 C to about 0.2 C.

A BET specific surface area of the anode may be less than about 5.0 m²/g, or about 0.6 m²/g to about 2.0 m²/g. When the BET specific surface area of the anode is less than about 5.0 m²/g, the electrochemical cycle-life characteristics of the battery may be improved. In an embodiment, the BET is measured by charging and discharging a lithium secondary battery including the anode, fully discharging the battery down to less than or equal to about 3 V, disassembling the battery to obtain the anode, cutting the anode into a predetermined size, and putting the cut anode in a BET sample holder in a nitrogen gas adsorption method.

The anode may have a cross-section loading level (L/L) of 6 mg/cm² to 65 mg/cm².

In the anode active material, the carbon-based anode active material may be artificial graphite, or a mixture of artificial graphite and natural graphite. When the anode active material is a crystalline carbon-based material such as artificial graphite or a mixture of natural graphite and artificial graphite, the crystalline carbon-based material has more developed crystalline characteristics than an amorphous carbon-based active material and thus may further improve orientation characteristics of a carbon material in an electrode with respect to an external magnetic field. The artificial graphite or natural graphite may be unspecified-shaped, sheet-shaped, flake-shaped, spherically-shaped, fiber-shaped, or a combination thereof without a particular limit. In addition, the artificial graphite is mixed with the natural graphite in a ratio of about 70:30 wt % to about 95:5 wt %

Furthermore, the anode active material layer may include at least one non-carbon-based material from a Si-based anode active material, a Sn-based anode active material or a lithium vanadium oxide anode active material. When the anode active material layer further includes these materials, that is, the carbon-based anode active material as a first anode active material and the non-carbon-based material as a second anode active material, the first and second anode active materials may be mixed in a weight ratio of about 50:50 to about 99:1.

The Si-based anode active material may be Si, a Si—C composite, $SiO_x$ (0<x<2), and an Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof but not Si), and the Sn-based anode active material is selected from Sn, $SnO_2$, an Sn—R alloy (wherein R is an element selected from an alkali metal, an alkaline-earth metal, a Group 13 element, a Group 14 element, a Group 15 element, a Group 16 element, a transition metal, a rare earth element, and a combination thereof but not Si), and the like and also, a mixture of at least one thereof with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

In the anode active material layer, the amount of the anode active material may be about 95 wt % to about 99 wt % based on the total weight of each layer, so that it may be about 95 wt % to about 99 wt % based on the total weight of the anode active material layer.

The anode active material layer includes a binder, and may further include a conductive material. In the anode active material layer, the amount of the binder may be about 1 wt % to about 5 wt % based on the total weight of the anode active material layer. In addition, when the conductive material is further included, about 90 wt % to about 98 wt % of the anode active material, about 1 wt % to about 5 wt % of the binder, and about 1 wt % to about 5 wt % of the conductive material may be included.

The binder improves binding properties of anode active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinylfluoride, polyurethane, polytetrafluoro ethylene, polyvinylidene fluoride, polyethylene, polypropylene, polyamide imide, polyimide, or a combination thereof.

The aqueous binder may be a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polyepichlorohydrin, polyphosphazene, an ethylene propylene diene copolymer, polyvinylpyridine, chlorosulfonated polyethylene, latex, polyester resin, an acrylic resin, a phenolic resin, an epoxy resin, polyvinyl alcohol, or a combination thereof.

When the aqueous binder is used as an anode binder, a cellulose-based compound may be further used to provide viscosity as a thickener. The cellulose-based compound includes one or more of carboxymethyl cellulose, hydroxypropyl methyl cellulose, methyl cellulose, or alkali metal salts thereof. The alkali metal may be Na, K, or Li. The thickener may be included in an amount of about 0.1 parts by weight to about 3 parts by weight based on 100 parts by weight of the anode active material.

The conductive material is included to provide electrode conductivity, and any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The anode according one embodiment may be prepared by applying a magnetic field when an anode active material composition is coated on a current collector. The anode active material layer preparation, for example, an anode active material layer with three layers, will be illustrated, with reference to FIG. 3.

Figure 3:
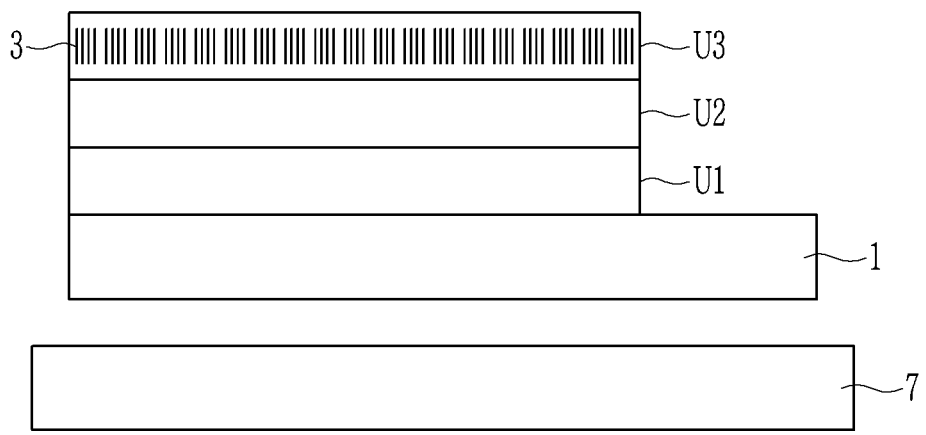
FIG. 3 is a schematic view for orientations of the anode according to one embodiment of the present invention.

As shown in FIG. 3, a current collector 1 is disposed on a magnet 7, and a first layer composition including an anode active material 3 is coated on the current collector 1. After coating the first layer composition, drying is performed to prepare a first layer U1. Thereafter, a second layer composition including an anode active material is coated on the first layer and dried to prepare a second layer U2, and a third layer composition including an anode active material is coated on the second layer and dried to prepare a third layer U3.

The anode active material 3 included in the third layer U3 is an oriented layer in which the anode active material is oriented to the current collector at a predetermined angle, and FIG. 3 only shows the anode active material 3 oriented in the third layer U3 as a surface layer being the oriented layer is an important factor and does not show the orientation state of the anode active materials included in the first layer and the second layer.

The magnet may have strength of a magnetic field of about 1000 Gauss to about 10000 Gauss. In addition, the anode active material composition may be coated on the current collector and maintained for about 3 seconds to about 9 seconds, that is, may be exposed to the magnetic field for about 3 seconds to about 9 seconds.

When such applying of the magnetic field is performed, in particular, when the coating process is performed while the current collector is moved, the magnetic field (magnetic flux) formed by the magnet may be formed vertically with the current collector, but since the magnetic field according to a coating speed (a speed of moving the current collector) is formed at a predetermined angle as a vector function, the anode active material included in the first and the second composition may stand, that is, be oriented at the predetermined angle on the surface of the current collector.

In particular, when the coating process is performed while the current collector is moved, the magnetic field (magnetic flux) formed by the magnet may be formed vertically with the current collector, but since the magnetic field according to a coating speed (a speed of moving the current collector) is formed at a predetermined angle as a vector function, the anode active material included in the anode active material composition may stand, that is, be oriented at the predetermined angle on the surface of the current collector.

Herein, the viscosities of the first layer composition, the second layer composition, and the third layer composition are adjusted to form the first layer, the second layer, and the third layer with a different a DD value therewith, even though the same magnetic fields are applied for the first layer, the second layer, and the third layer preparations. That is, in preparation of the multi-layer structure of three or more layers, it is desired that the viscosity of the composition for preparing layer is adjusted to be an oriented layer or a non-oriented layer to prepare each layer.

In order to prepare the layer to be formed to be an oriented layer, the viscosity of the composition should be 2000 cps or more, and less than 4000 cps at room temperature (about 20° C. to about 25° C.), and in order to prepare the layer to be formed to be a non-oriented layer, the viscosity of the composition should be 4000 cps to 5000 cps at room temperature (about 20° C. to about 25° C.). In particular, when the viscosity of the composition falls in the range of 2000 cps or more, and less than 4000 cps at room temperature (about 20° C. to about 25° C.), the prepared layer may be an oriented layer with the DD value of 19 or more, and more specifically, when the viscosity of the composition falls in the range of 2000 cps to 3500 cps at room temperature (about 20° C. to about 25° C.), the prepared layer may be an oriented layer with the DD value of 19 to 60.

Furthermore, when the viscosity of the composition is 4000 cps to 5000 cps at room temperature (about 20° C. to about 25° C.), the prepared layer may be a non-oriented layer having the DD value of less than 19.

As such, if they are out of the range, the desired degree of the orientation may not be obtained.

The composition may be prepared by mixing the anode active material, the binder, and the conductive material in a solvent.

The anode active material, the binder, and the conductive material are the same as the above description. The solvent may be an organic solvent such as N-methyl pyrrolidone, or water, and when the aqueous binder is used as the binder, the solvent may be water.

A lithium secondary battery according to another embodiment includes the anode, a cathode, and an electrolyte.

The lithium secondary battery may be a battery for high power. In other words, the lithium secondary battery may be usefully applied to an electronic device requiring high power such as a power tool, an electric vehicle, a vacuum cleaner, and the like. The reason is that the lithium secondary battery including the anode according to an embodiment may easily release heat generated during the charge and discharge and particularly, when applied to a high-capacity cell and an electronic device for high power, deterioration due to the heat may be suppressed and it may be effectively used as a high power battery. In addition, the lithium secondary battery may easily release heat according to the charge and discharge and be a battery temperature increase may be suppressed and thus effectively improve cycle-life characteristics and particularly, cycle-life characteristics at a high rate.

This high power battery may be a cylindrical, pouch-shaped battery, or a stack-shaped battery. In addition, this cylindrical battery may be a 18650 battery (a diameter of 18 mm, a height of 65 mm) and a 21700 battery (a diameter of 21 mm, a height of 70 mm), but is not limited thereto.

The cathode may include a positive current collector and a cathode active material layer formed on the positive current collector. The cathode active material may include lithiated intercalation compounds that reversibly intercalate and deintercalate lithium ions. Specifically, one or more composite oxides of a metal selected from cobalt, manganese, nickel, and a combination thereof, and lithium may be used. More specifically, the compounds represented by one of the following chemical formulae may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2GbO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \le f \le 2$); $Li_{(3-f)}Fe_2PO_{43}$ ($0 \le f \le 2$); $Li_aFePO_4$ ($0.90 \le a \le 1.8$)

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

Also, the compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a cathode active material by using these elements in the compound, and for example, the method may include any coating method such as spray coating, dipping, and the like, but is not illustrated in more detail since it is well-known in the related field.

In the cathode, a content of the cathode active material may be about 90 wt % to about 98 wt % based on the total weight of the cathode active material layer.

In an embodiment, the cathode active material layer may further include a binder and a conductive material. Herein, the binder and the conductive material may be included in an amount of about 1 wt % to about 5 wt %, respectively based on the total amount of the cathode active material layer.

The binder improves binding properties of cathode active material particles with one another and with a current collector. Examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. Furthermore, the ketone-based solvent may include cyclohexanone, and the like. The alcohol-based solvent may include ethyl alcohol, isopropyl alcohol, and the like, and examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance and it may be well known to one in the related art.

Furthermore, the carbonate-based solvent may include a mixture of a cyclic carbonate and a linear carbonate. The cyclic carbonate and linear carbonate are mixed together in a volume ratio of about 1:1 to about 1:9, and when the mixture is used as an electrolyte, it may have enhanced performance.

The organic solvent may further include an aromatic hydrocarbon-based solvent as well as the carbonate-based solvent. Herein, the carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

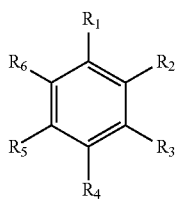

[Chemical Formula 1]

(In Chemical Formula 1, $R_1$ to $R_6$ are the same or different and are selected from hydrogen, a halogen, a C1 to C10 alkyl group, a haloalkyl group, and a combination thereof.)

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 2, or propanesultone to improve cycle life.

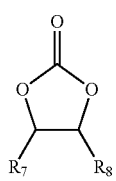

[Chemical Formula 2]

(In Chemical Formula 2, $R_7$ and $R_8$ are the same or different and may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.)

Examples of the ethylene carbonate-based compound include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the lithium secondary battery, and improves transportation of the lithium ions between the cathode and the anode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The lithium secondary battery may further include a separator between the anode and the cathode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 4:
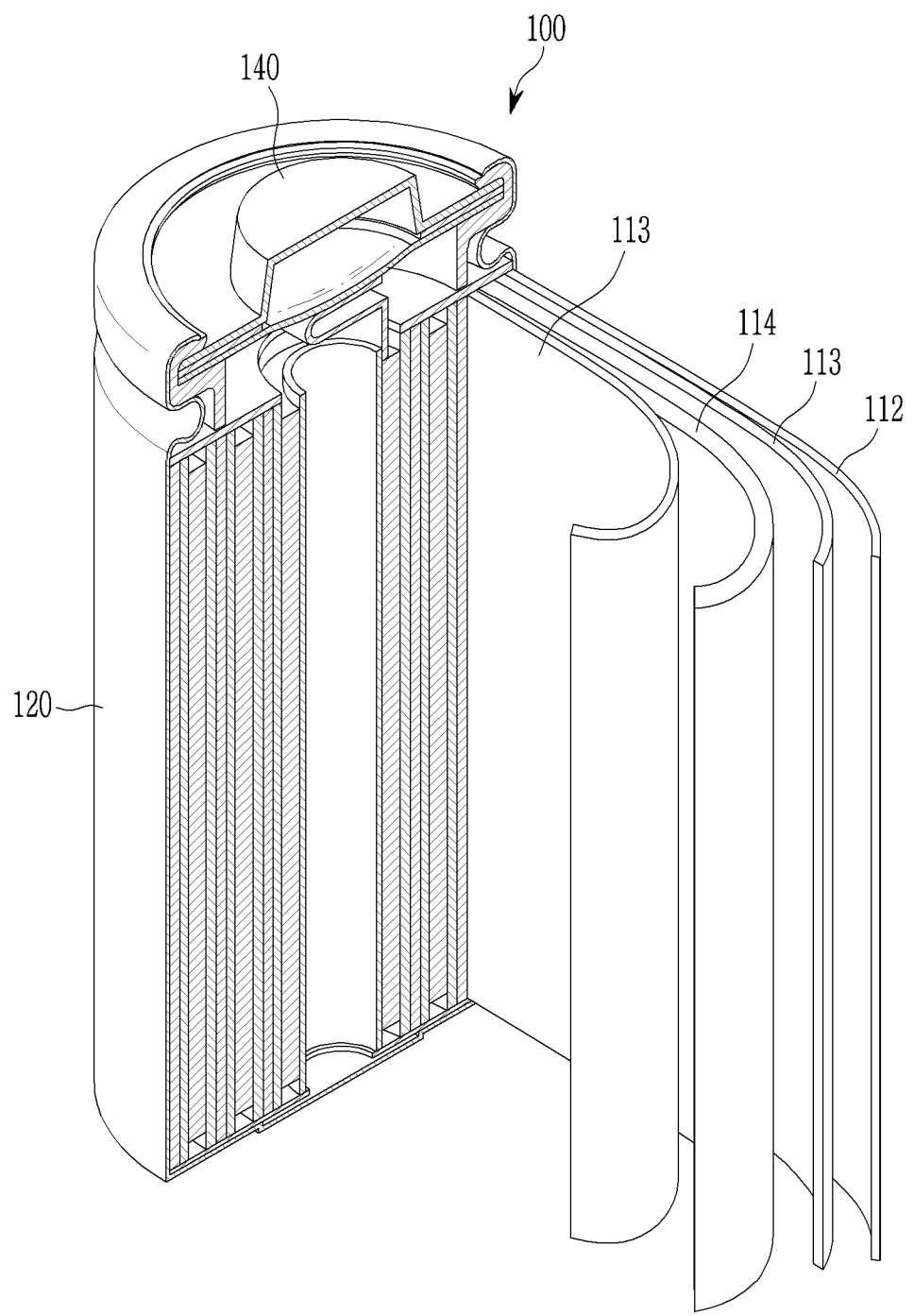
FIG. 4 is a schematic view showing a structure of the lithium secondary battery according to one embodiment.

FIG. 4 is an exploded perspective view of a lithium secondary battery according to an embodiment. A lithium secondary battery according to an embodiment may be a cylindrical battery.

Referring to FIG. 4, a lithium secondary battery 100 is a cylindrical battery and includes an anode 112, a cathode 114, and a separator 113, an electrolyte (not shown) immersed into the anode 112, the cathode 114, and the separator 113, a battery case 120, and a sealing member 140 housing the battery case 120.

Such a lithium secondary battery 100 is manufactured by sequentially stacking the anode 112, the separator 113, and the cathode, winding it in a spiral form and housing it the battery case 120.

EXAMPLES

Hereinafter, examples of the present invention and comparative examples are described. These examples, however, are not in any sense to be interpreted as limiting the scope of the invention.

Example 1: Three-layered Structure with the First Layer and the Surface Layer (Third Layer) Being Oriented Layers 97.5 wt % of artificial graphite, 1.5 wt % of styrene butadiene rubber, and 1.0 wt % of carboxymethyl cellulose were mixed with a water solvent to prepare an anode active material slurry for a first layer, with a viscosity (at 25° C.) of 3000 cps.

97.5 wt % of artificial graphite, 1.5 wt % of styrene butadiene rubber, and 1.0 wt % of carboxymethyl cellulose were mixed with a water solvent to prepare an anode active material slurry for a second layer, with a viscosity (at 25° C.) of 4000 cps.

97.5 wt % of artificial graphite, 1.5 wt % of styrene butadiene rubber, and 1.0 wt % of carboxymethyl cellulose were mixed with a water solvent to prepare an anode active material slurry for a third layer, with a viscosity (at 25° C.) of 2000 cps.

A Cu foil was disposed on a magnet having a magnetic field strength of 4000 Gauss, and the anode active material slurry for the first layer was coated on the Cu foil, while the Cu foil was moved to expose a magnetic field for 9 seconds, and dried to form a first layer with a one-side thickness of 40 μm.

Thereafter, the anode active material slurry for the second layer was coated on the first layer, was exposed to a magnetic field for 9 seconds, and dried to prepare a second layer with a thickness of 40 μm, and the anode active material slurry for the third layer was coated on the second layer, and exposed to a magnetic field for 9 seconds, and dried to prepare a third layer with a thickness of 50 μm.

After the first layer, the second layer, and the third layer were formed, compression was performed to an anode having a one surface loading level (L/L) of 15 mg/cm$^2$.

96 wt % of LiCoO$_2$, 2 wt % of ketjen black, and 2 wt % of polyvinylidene fluoride were mixed in an N-methyl pyrrolidone solvent to prepare a cathode active material slurry. The cathode active material slurry was coated on an Al current collector, dried, and compressed to prepare a cathode.

The negative and cathodes and an electrolyte were used to manufacture a 18650-type cylindrical lithium secondary battery cell which is a full cell having capacity of 550 mAh and current density of 4.70 mAh/cm$^2$. Herein, the electrolyte was prepared by using a mixed solvent of ethylene carbonate and diethyl carbonate (50:50 of a volume ratio) and dissolving 1 M LiPF$_6$ therein.

Example 2: Four-layered Structure with the First Layer and the Surface Layer (Fourth Layer) Being Oriented Layers 97.5 wt % of artificial graphite, 1.5 wt % of styrene butadiene rubber, and 1.0 wt % of carboxymethyl cellulose were mixed with a water solvent to prepare an anode active material slurry for a first layer, with a viscosity (at 25° C.) of 3000 cps.

97.8 wt % of artificial graphite, 1.5 wt % of styrene butadiene rubber, and 0.7 wt % of carboxymethyl cellulose were mixed with a water solvent to prepare an anode active material slurry for a second layer, with a viscosity (at 25° C.) of 4000 cps.

98.2 wt % of artificial graphite, 0.3 wt % of styrene butadiene rubber, and 1.5 wt % of carboxymethyl cellulose were mixed with a water solvent to prepare an anode active material slurry for a third layer, with a viscosity (at 25° C.) of 4000 cps.

97.5 wt % of artificial graphite, 1.5 wt % of styrene butadiene rubber, and 1.0 wt % of carboxymethyl cellulose were mixed with a water solvent to prepare an anode active material slurry for a fourth layer, with a viscosity (at 25° C.) of 2000 cps.

A Cu foil was disposed on a magnet having a magnetic field strength of 4000 Gauss, and the anode active material slurry for the first layer was coated on the Cu foil, while the Cu foil was moved to expose a magnetic field for 9 seconds, and dried to form a first layer with a one-side thickness of 30 μm.

Thereafter, the anode active material slurry for the second layer was coated on the first layer, was exposed to a magnetic field for 9 seconds, and dried to prepare a second layer with a thickness of 30 μm, the anode active material slurry for the third layer was coated on the second layer, and exposed to o a magnetic field for 9 seconds, and dried to prepare a third layer with a thickness of 30 μm, and the anode active material slurry for the fourth layer was coated on the second layer, and exposed to a magnetic field for 9 seconds, and dried to prepare a fourth layer with a thickness of 40 μm.

After the first layer, the second layer, the third layer, and the fourth layer were formed, compression was performed to an anode having a one surface loading level (L/L) of 15 mg/cm$^2$.

Using the anode, a lithium secondary battery was fabricated by the same procedure as in Example 1.

Example 3: Five-layered Structure with the First Layer, the Third Layer, and the Surface Layer (Fifth Layer) Being Oriented Layers 97.5 wt % of artificial graphite, 1.5 wt % of styrene butadiene rubber, and 1.0 wt % of carboxymethyl cellulose were mixed with a water solvent to prepare an anode active material slurry for a first layer, with a viscosity (at 25° C.) of 3000 cps.

97.5 wt % of artificial graphite, 1.2 wt % of styrene butadiene rubber, and 1.3 wt % of carboxymethyl cellulose were mixed with a water solvent to prepare an anode active material slurry for a second layer, with a viscosity (at 25° C.) of 4000 cps.

97.5 wt % of artificial graphite, 1.5 wt % of styrene butadiene rubber, and 1 wt % of carboxymethyl cellulose were mixed with a water solvent to prepare an anode active material slurry for a third layer, with a viscosity (at 25° C.) of 3000 cps.

98.2 wt % of artificial graphite, 0.3 wt % of styrene butadiene rubber, and 1.5 wt % of carboxymethyl cellulose were mixed with a water solvent to prepare an anode active material slurry for a fourth layer, with a viscosity (at 25° C.) of 2000 cps.

97.5 wt % of artificial graphite, 1.5 wt % of styrene butadiene rubber, and 1.0 wt % of carboxymethyl cellulose were mixed with a water solvent to prepare an anode active material slurry for a fifth layer, with a viscosity (at 25° C.) of 2000 cps.

A Cu foil was disposed on a magnet having a magnetic field strength of 4000 Gauss, and the anode active material slurry for the first layer was coated on the Cu foil, while the Cu foil was moved to expose a magnetic field for 9 seconds, and dried to form a first layer with a one-side thickness of 30 μm.

Thereafter, the anode active material slurry for the second layer was coated on the first layer, was exposed to a magnetic field for 9 seconds, and dried to prepare a second layer with a thickness of 30 μm, the anode active material slurry for the third layer was coated on the second layer, and exposed to o a magnetic field for 9 seconds, and dried to prepare a third layer with a thickness of 30 μm, the anode active material slurry for the fourth layer was coated on the second layer, and exposed to o a magnetic field for 9 seconds, and dried to prepare a fourth layer with a thickness of 40 μm, the anode active material slurry for the fifth layer was coated on the second layer, and exposed to a magnetic field for 9 seconds, and dried to prepare a fifth layer with a thickness of 40 μm.

After the first layer, the second layer, the third layer, the fourth layer, and the fifth layer were formed, compression was performed to an anode having a one surface loading level (L/L) of 15 mg/cm².

Using the anode, a lithium secondary battery was fabricated by the same procedure as in Example 1.

Comparative Example 1: Two-layered Structure of Oriented Layer and Non-oriented Layer 97.5 wt % of artificial graphite, 1.5 wt % of styrene butadiene rubber, and 1.0 wt % of carboxymethyl cellulose were mixed with a water solvent to prepare an anode active material slurry for a first layer, with a viscosity (at 25° C.) of 4500 cps.

97.5 wt % of artificial graphite, 1.5 wt % of styrene butadiene rubber, and 1.0 wt % of carboxymethyl cellulose were mixed with a water solvent to prepare an anode active material slurry for a second layer, with a viscosity (at 25° C.) of 2500 cps.

A Cu foil was disposed on a magnet having a magnetic field strength of 4000 Gauss, and the anode active material slurry for the first layer was coated on the Cu foil, while the Cu foil was moved to expose it to a magnetic field for 3 seconds, and dried to form a first layer with a one-side thickness of 60 μm.

Thereafter, the anode active material slurry for the second layer was coated on the first layer, was exposed it to a magnetic field for 9 seconds, and dried to prepare a second layer with a thickness of 70 μm.

After the first layer and the second layer were formed, compression was performed to an anode having a one surface loading level (L/L) of 15 mg/cm².

Using the anode, a lithium secondary battery was fabricated by the same procedure as in Example 1.

Comparative Example 2: Presentation of Oriented Portion and Non-oriented Portion in the Same Layer 97.5 wt % of artificial graphite, 1.5 wt % of styrene butadiene rubber, and 1 wt % of carboxymethyl cellulose were mixed with a water solvent to prepare an anode active material slurry with a viscosity (at 25° C.) of 3000 cps.

Two magnets having a magnetic field of 4000 Gauss were fixed at an predetermined interval in a width direction of the electrode, and a Cu foil was disposed on the magnet, the anode active material slurry for the first layer was coated on the Cu foil, while the Cu foil was moved to expose it to a magnetic field for 9 seconds, and dried to form a first layer with a one-side thickness of 130 μm. In the prepared coating layer, any portion directly positioned on the magnet and affected by the magnetic field was prepared as the oriented portion and any portion positioned between two magnets, i.e. between one magnet and the other magnets and not affected by the magnetic field was prepared as the non-oriented portion.

After the coating layers were formed, compression was performed to an anode having a one surface loading level (L/L) of 15 mg/cm².

Using the anode, a lithium secondary battery was fabricated by the same procedure as in Example 1.

Measurement of X-ray Diffraction Characteristic

The lithium secondary cells according to Examples 1 to 9 and Comparative Examples 1 to 3 were charged and discharged at 0.1 C twice, and fully discharged at 0.1 C to 2.75 V. The fully-discharged battery cells were disassembled to obtain anodes. As for these anodes, X'Pert (PANalytical B.V.) XRD equipment using a CuKα ray as a target ray was used, but monochromator equipment was removed in order to improve a peak intensity resolution. Herein, the measurement was performed under a condition of 2θ=10° to 80°, a scan speed (°/S)=0.06436, and a step size of 0.026°/step.

From the measured XRD results, the DD values of the total anode active material layer and the first layer were calculated, and the results are shown in Table 1.

The areas of the peaks shown at 2θ=26.5±0.2° ((002) plane), 42.4±0.2° ((100) plane), 43.4±0.2° ((101) R plane), 44.6±0.2° ((101) H plane), 54.7±0.2° ((004) plane), and 77.5±0.2° ((110) plane) were measured, and the area sum of peaks shown at 2θ=42.4±0.2° ((100) plane), 43.4±0.2° ((101)R plane), 44.6±0.2° ((101)H plane), and 77.5±0.2° ((110) plane) as $I_a$, and the area sum of peaks shown at 2θ=26.50.2° ((002) plane), 42.40.2° ((100) plane), 43.40.2° ((101)R plane), 44.60.2° ((101)H plane), 54.70.2° ((004) plane), and 77.50.2° ((110) plane) as $I_{total}$, and DD ($I_{total}/I_a$) was obtained by calculating from the values. The results are shown in Table 2.

Furthermore, the $I_{(004)}/I_{(002)}$ and $I_{(110)}/I_{(004)}$ were calculated, and the results are shown in Table 2. In particular, a peak at 43.4±0.2° appeared by overlapping a peak of a (101)R plane of graphite with another peak of a (111) plane of a Cu current collector.

Rate-capability Characteristic Evaluation

The lithium secondary cells according to Examples 1 to 9 and Comparative Examples 1 to 3 were charged at each C-rate of 0.2 C, 0.5 C, 1 C, 1.5 C, and 2.0 C once, and the capacity ratios of each C-rate to 0.2 C were measured. The results are shown in Table 3.

TABLE 1

|  | Total DD | DD of first layer | DD of second layer | DD of third layer | DD of fourth layer | DD of fifth layer |
| --- | --- | --- | --- | --- | --- | --- |
| Example 1 | 30.5 | 36.2 | 18.5 | 28.9 |  |  |
| Example 2 | 31.1 | 34.8 | 18.8 | 17.5 | 29.2 |  |
| Example 3 | 29.9 | 33.3 | 18.1 | 27.1 | 18.0 | 28.5 |
| Comparative Example 1 | 30.8 | 18 | 38 |  |  |  |
| Comparative Example 2 | 29.1 | 29.1 |  |  |  |  |

As shown in Table 1, DD values of the anode according to Examples 1 to 3 were 28.9 to 31.1 and the DD values of the first layer and the third layer of the first layer and the fourth layer of Example 2, and the first layer, the third layer, and the fifth layer of Example 3 fall in the range of 19 to 60, which indicated oriented layers.

TABLE 2

| | Total $I_{(002)}/I_{(110)}$ | $I_{(002)}/I_{(110)}$ of first layer | $I_{(002)}/I_{(110)}$ of second layer | $I_{(002)}/I_{(110)}$ of third layer | $I_{(002)}/I_{(110)}$ of fourth layer | $I_{(002)}/I_{(110)}$ of fifth layer |
|---|---|---|---|---|---|---|
| Example 1 | 97.2 | 87 | 483 | 113.1 | — | — |
| Example 2 | 95.1 | 89 | 481.2 | 490.6 | 99.6 | — |
| Example 3 | 99.5 | 92 | 485.5 | 100.1 | 490.6 | 112.8 |
| Comparative Example 1 | 96.8 | 479.5 | 85 | — | — | — |
| Comparative Example 2 | 98.6 | 98.6 | — | — | — | — |

As shown in Table 2, the peak intensity $I_{(002)}/I_{(110)}$ of the anode falls in a range of 50 to 300, and the intensity $I_{(002)}/I_{(110)}$ of the oriented layer falls in a range of 10 to 200.

TABLE 3

| | Rate capability (%) | | | | |
|---|---|---|---|---|---|
| | 0.2 C | 0.5 C | 1.0 C | 1.5 C | 2.0 C |
| Example 1 | 100 | 96.1 | 92.4 | 86.5 | 75 |
| Example 2 | 100 | 96.5 | 91.4 | 84 | 72.1 |
| Example 3 | 100 | 95.8 | 90.9 | 84.5 | 72.5 |
| Comparative Example 1 | 100 | 96.1 | 90.4 | 80.5 | 65.4 |
| Comparative Example 2 | 100 | 95.1 | 88.6 | 76.5 | 60.4 |

As shown in Table 3, Examples 1 to 3 in which the surface layer was the oriented layer and the active material layer included three or more layers exhibited excellent high rate charge and discharge characteristics. Whereas Comparative Example 1 having two layers, regardless of including the oriented layer, and Comparative Example 2 in which the oriented and the non-oriented portions were formed in one layer, the separated layer exhibited deteriorated high-rate charge and discharge cycle-life characteristics.

BET Evaluation

The lithium secondary battery cells according to Examples 1 to 3 and Comparative Examples 1 and 2 were charged and discharged at 0.1 C and fully discharged to 3 V, and then disassembled to obtain anodes. The anodes were respectively used to obtain each 5 cm×5 cm size sample, these samples were respectively cut into a size of 0.5 cm×0.5 cm and put in a BET sample holder, and then their BET's were measured in a nitrogen gas adsorption method, and the results are shown in Table 4.

TABLE 4

| | BET (m²/g) |
|---|---|
| Example 1 | 0.71 |
| Example 2 | 0.72 |
| Example 3 | 0.69 |
| Comparative Example 1 | 0.75 |
| Comparative Example 2 | 0.73 |

Cycle-Life Characteristic Evaluation

The full cells of Examples 1 to 3 and Comparative Examples 1 and 2 were respectively constant current/constant voltage charged under a condition of 1.0 C, 4.4 V, and a 0.1 C cut-off, paused for 5 minutes, and constant current discharged under a condition of 1.0 C and a 3.0 V cut-off and paused for 5 minutes as one cycle, and this cycle was repeated 300 times. A capacity retention depending on a charge and discharge cycle was evaluated by calculating a discharge capacity ratio at each cycle relative to discharge capacity at the first cycle.

The results are shown in Table 5.

TABLE 5

| | Cycle characteristic (%) |
|---|---|
| Example 1 | 80 |
| Example 2 | 79.5 |
| Example 3 | 78.9 |
| Comparative Example 1 | 70.5 |
| Comparative Example 2 | 62.1 |

As shown in Table 5, the cells including the anodes according to Examples 1 to 3 in which the active material layer included three or more layers, and the surface layer was the oriented layer, exhibited excellent cycle-life characteristics compared to cells with two active material layers (Comparative Example 1), or with one layer in which the oriented portion and the non-oriented portion were formed (Comparative Example 2).

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An anode for a lithium secondary battery, comprising:
   a current collector; and
   an anode active material layer formed on the current collector, and comprising a carbon-based anode active material,
   wherein the anode active material layer has a multi-layer structure of three or more layers,
   at least one layer of the anode active material layer is an oriented layer having a DD (Degree of Divergence) value defined by Equation 1 of 19 or more:

$$DD \text{ (Degree of Divergence)} = (I_a/I_{total}) * 100 \quad \text{[Equation 1]}$$

(in Equation 1,
   $I_a$ is a sum of peak intensities at non-planar angles measured by XRD using a CuKα ray, and $I_{total}$ is a sum of peak intensities at all angles measured by XRD using a CuKα ray), wherein at least one layer of the anode active material layer is an oriented layer having the DD value of 19 or more, and at least one layer is a non-oriented layer having the DD value of less than 19.

2. The anode for the lithium secondary battery of claim 1, wherein the active material layer is a multi-layer structure of three layers or five layers.

3. The anode for the lithium secondary battery of claim 1, wherein the anode active material layer having the multi-layer structure of three layers or more comprises an inner layer contacted with the current collector, a surface layer, and at least one middle layer between the inner layer and the surface layer, and the surface layer is the oriented layer with the DD value of 19 or more.

4. The anode for the lithium secondary battery of claim 1, wherein the oriented layer has a DD value of 19 to 60.

5. The anode for the lithium secondary battery of claim 1, wherein the $I_a$ is a sum of peak intensities at $2\theta=42.4\pm0.2°$, $43.4\pm0.2°$, $44.6\pm0.2°$, and $77.5\pm0.2°$ measured by XRD using a CuKα ray, and the $I_{total}$ is a sum of peak intensities at $2\theta=26.5\pm0.2°$, $42.4\pm0.2°$, $43.4\pm0.2°$, $44.6\pm0.2°$, $54.7\pm0.2°$, and $77.5\pm0.2°$ measured by XRD using a CuKα ray.

6. The anode for the lithium secondary battery of claim 1, wherein the peak intensities are peak integral area values.

7. The anode for the lithium secondary battery of claim 1, wherein the anode has a peak intensity ratio, at a (002) plane relative to a (110) plane, that is, $I_{(002)}/I_{(110)}$ of 50 to 300 measured by XRD using a CuKα ray.

8. The anode for the lithium secondary battery of claim 1, wherein the oriented layer has a peak intensity ratio, at a (002) plane relative to a (110) plane, that is, $I_{(002)}/I_{(110)}$ of 10 to 200 measured by XRD using a CuKα ray.

9. The anode for the lithium secondary battery of claim 1, wherein the non-oriented layer has a peak intensity ratio, at a (002) plane relative to a (110) plane, that is, $I_{(002)}/I_{(110)}$ of 200 to 500 measured by XRD using a CuKα ray.

10. The anode for the lithium secondary battery of claim 1, wherein the anode active material layer has a total thickness of 100 μm to 1000 μm.

11. The anode for the lithium secondary battery of claim 1, wherein the carbon-based anode active material is artificial graphite or a mixture of artificial graphite and natural graphite.

12. The anode for the lithium secondary battery of claim 1, wherein the anode active material layer further includes a Si-based anode active material, a Sn-based anode active material, a lithium vanadium oxide, or a combination thereof.

13. A lithium secondary battery, comprising:
an anode of claim 1;
a cathode; and
an electrolyte.

14. The lithium secondary battery of claim 13, wherein the lithium secondary battery is a high-power battery.

* * * * *

UNITED STATES PATENT AND TRADEMARK OFFICE
CERTIFICATE OF CORRECTION

| | | |
|---|---|---|
| PATENT NO. | : 12,155,057 B2 | Page 1 of 1 |
| APPLICATION NO. | : 17/594486 | |
| DATED | : November 26, 2024 | |
| INVENTOR(S) | : Jinhyon Lee et al. | |

It is certified that error appears in the above-identified patent and that said Letters Patent is hereby corrected as shown below:

In the Claims

In Column 18, Line 60, in Claim 1, delete "anglesmeasured" and insert -- angles measured --.

Signed and Sealed this
Fifteenth Day of April, 2025

Coke Morgan Stewart
*Acting Director of the United States Patent and Trademark Office*